US009853913B2

United States Patent
Foskett et al.

(10) Patent No.: US 9,853,913 B2
(45) Date of Patent: Dec. 26, 2017

(54) MULTI-CLOUD NETWORK PROXY FOR CONTROL AND NORMALIZATION OF TAGGING DATA

(71) Applicant: Accenture Global Services Limited, Dublin (IE)

(72) Inventors: Roger Foskett, Middlesex (GB); Catherine Ruth Gulsvig Wood, St. Paul, MN (US)

(73) Assignee: Accenture Global Services Limited, Dublin (IE)

( * ) Notice: Subject to any disclaimer, the term of this patent is extended or adjusted under 35 U.S.C. 154(b) by 274 days.

(21) Appl. No.: 14/835,217

(22) Filed: Aug. 25, 2015

(65) Prior Publication Data

US 2017/0063720 A1    Mar. 2, 2017

(51) Int. Cl.
*H04L 12/911* (2013.01)
*H04L 29/08* (2006.01)
*G06F 9/50* (2006.01)

(52) U.S. Cl.
CPC ............ *H04L 47/82* (2013.01); *G06F 9/5072* (2013.01); *H04L 67/28* (2013.01); *H04L 67/2804* (2013.01)

(58) Field of Classification Search
CPC .... G06F 9/5072; G06F 9/5077; G06F 9/5061; G06F 17/30103; G06F 17/30112; G06F 17/30525; G06F 17/30864; G06F 17/30876; G06F 9/45558; G06F 2009/4557; G06F 2009/45583; G06F 3/061; G06F 3/0641; G06F 3/0652; G06F 12/084;

(Continued)

(56) References Cited

U.S. PATENT DOCUMENTS

| 6,725,378 B1 | 4/2004 | Schuba |
| 6,925,642 B1 | 8/2005 | Commander |
| 6,963,828 B1 | 11/2005 | McDonald |

(Continued)

FOREIGN PATENT DOCUMENTS

| EP | 3136236 A1 | 3/2017 |
| WO | WO 2010035281 A1 | 4/2010 |
| WO | WO 2012/021324 A2 | 2/2012 |

OTHER PUBLICATIONS

Ejarque et al. "SLA-Driven Semantically-Enhanced Dynamic Resource Allocator for Virtualized Service Providers", IEEE Fourth International Conference on eScience, Dec. 7, 2008, IEEE, pp. 8-15.*

(Continued)

*Primary Examiner* — Vivek Srivastava
*Assistant Examiner* — Todd L Barker
(74) *Attorney, Agent, or Firm* — Brinks Gilson & Lione

(57) ABSTRACT

Provisioning resources into the cloud is a constantly increasing technical challenge as more cloud service providers emerge, each offering disparate computing platforms, services, assets, supported technical components, and other features. A multi-cloud network proxy controls and normalizes the tagging data applicable across the multiple cloud service providers. The network proxy provides a central control mechanism for discovering, monitoring, and updating complex tagging data applied to the technical components provisioned with the cloud service providers. The network proxy also dynamically generates technical component request interfaces that include specifically prioritized metadata tags.

20 Claims, 12 Drawing Sheets

(58) Field of Classification Search
CPC ..... G06F 12/0866; H04L 67/82; H04L 67/00; H04L 67/28; H04L 67/2804; H04L 47/82
See application file for complete search history.

(56) References Cited

U.S. PATENT DOCUMENTS

| | | |
|---|---|---|
| 7,249,176 B1 | 7/2007 | Salas et al. |
| 7,376,693 B2 | 5/2008 | Neiman et al. |
| 7,631,020 B1 | 12/2009 | Wei et al. |
| 7,668,703 B1 | 2/2010 | Rolia |
| 7,747,750 B1 | 6/2010 | Simon et al. |
| 8,341,270 B2 | 12/2012 | Mazzaferri et al. |
| 8,447,851 B1* | 5/2013 | Anderson ........... G06F 11/3006 707/600 |
| 8,484,355 B1 | 7/2013 | Lochhead et al. |
| 8,539,484 B1 | 9/2013 | Offer et al. |
| 8,886,806 B2 | 11/2014 | Tung et al. |
| 9,256,467 B1* | 2/2016 | Singh .................... G06F 9/5055 |
| 9,697,130 B2* | 7/2017 | Karippara ................. G06F 9/50 |
| 2002/0120744 A1 | 8/2002 | Chellis et al. |
| 2003/0200300 A1 | 10/2003 | Melchione |
| 2004/0006589 A1 | 1/2004 | Maconi et al. |
| 2004/0111506 A1 | 6/2004 | Kundu |
| 2005/0044220 A1 | 2/2005 | Madhavan |
| 2005/0080838 A1 | 4/2005 | Colby et al. |
| 2006/0153090 A1 | 7/2006 | Bishop |
| 2007/0043860 A1 | 2/2007 | Pabari |
| 2008/0091806 A1 | 4/2008 | Shen |
| 2008/0114624 A1 | 5/2008 | Kitts |
| 2008/0244233 A1 | 10/2008 | Wilson |
| 2008/0244579 A1 | 10/2008 | Muller |
| 2008/0250267 A1 | 10/2008 | Brown |
| 2009/0083390 A1 | 3/2009 | Abu-Ghazaleh et al. |
| 2009/0300210 A1 | 12/2009 | Ferris |
| 2009/0327495 A1 | 12/2009 | Betts-LaCroix et al. |
| 2010/0042720 A1 | 2/2010 | Stienhans et al. |
| 2010/0217864 A1 | 8/2010 | Ferris |
| 2010/0306377 A1 | 12/2010 | DeHann et al. |
| 2010/0332617 A1 | 12/2010 | Goodwin et al. |
| 2011/0087776 A1 | 4/2011 | Tabone et al. |
| 2011/0087783 A1 | 4/2011 | Annapureddy et al. |
| 2011/0131306 A1 | 6/2011 | Ferris et al. |
| 2011/0138047 A1 | 6/2011 | Brown et al. |
| 2011/0145439 A1 | 6/2011 | Chaturvedi et al. |
| 2011/0166952 A1 | 7/2011 | Manchikanti |
| 2011/0191838 A1 | 8/2011 | Yanagihara |
| 2011/0213712 A1 | 9/2011 | Hadar et al. |
| 2011/0296021 A1 | 12/2011 | Dorai et al. |
| 2012/0030356 A1 | 2/2012 | Fletcher |
| 2012/0124211 A1 | 5/2012 | Kampas et al. |
| 2012/0311157 A1 | 12/2012 | Erickson et al. |
| 2012/0317084 A1* | 12/2012 | Liu ....................... G06F 3/0641 707/692 |
| 2013/0191650 A1 | 7/2013 | Balakrishnan et al. |
| 2013/0219211 A1 | 8/2013 | Gopinath et al. |
| 2013/0238785 A1* | 9/2013 | Hawk ................... G06F 9/5072 709/224 |
| 2014/0123136 A1* | 5/2014 | Beda, III ............ G06F 9/45558 718/1 |
| 2014/0172782 A1 | 6/2014 | Schuenzel et al. |
| 2014/0207824 A1* | 7/2014 | Brandwine ......... G06F 21/6209 707/785 |
| 2015/0066955 A1* | 3/2015 | Dubois ................. G06F 17/301 707/749 |

OTHER PUBLICATIONS

Buyya, et al., "Market-Oriented Cloud Computing Vision, Hype and Reality for Delivering It Services as Computing Utilities," High Performance Computing and Communications, Sep. 25, 2008, pp. 5-13, HPCC 08, 10$^{th}$ IEEE International Conference, Piscataway, New Jersey.

Prodan, et al., "A Survey and Taxonomy of Infrastructure as a Service and Web Hosting Cloud Providers," Oct. 13, 2008, pp. 17-25, 10$^{th}$ IEEE International Conference on Grid Computing, Piscataway, New Jersey.

Qian, et al., "Cloud Computing: An Overview," Jan. 1, 2009, pp. 626-631, Cloud Computing, vol. 5931, Springer-Verlag GmbH, Germany.

Vecchiola, et al., "Aneka: A Software Platform for .NET-based Cloud Computing," 2009, pp. 1-30, IOS Press, Fairfax, Virginia.

Tag Instances, https://elasticbox.com/documentation/managing-your-organization/resource-tags/, downloaded Jul. 20, 2015, pp. 1-8, ElasticBox, Inc., San Francisco, California.

Hector Fernandez, Surprised by your Cloud Bill every month? Try Cross-Cloud Tagging, Oct. 23, 2014, pp. 1-3, ElasticBox, Inc., San Francisco, California.

Cisco Prime Service Catalog 10.1 Adapter Integration Guide, Nov. 2014, pp. 1-364, Cisco Systems, Inc., San Jose, California.

Designing Integrations with Service Link Standard Adapters, Chapter 4, Cisco Prime Service Catalog 10.1 Adapter Integration Guide, Nov. 2014, pp. 1-72, Cisco Systems, Inc., San Jose, California.

International Search Report, App. No. PCT/EP2015/078653 dated Feb. 15, 2016, pp. 1-13.

Naik, et al., Architecture for Service Request Driven Solution Delivery Using Grid Systems, 2006, pp. 1-9, IEEE International Conference on Services Computing, Piscataway, New Jersey.

Examination Report, Australia App. No. 2016204567, dated Mar. 29, 2017, pp. 1-5.

Tag Instances, https://elasticbox.com/documentation/managing-your-organization/resources-tags/, downloaded Jul. 20, 2015, pp. 1-8, ElasticBox, Inc., San Francisco, California.

Hector Fernandez, Surprised by your Cloud Bill every month? Try Cross-Cloud Tagging, Oct. 23, 2014, pp. 1-3, ElaxticBox, Inc., San Francisco, California.

Australian Patent Examination Report No. 1, App. No. 2016204567 dated Aug. 26, 2016, pp. 1-7.

\* cited by examiner

1000

Order a Virtual Machine from Template (Red Provider)

Use this service to create a server on a Red provider target hosting platform, through an existing project account.

Customer Information — 1006
- Login ID: laser22
- E-mail address: laser22@*****.com

Client/Project Information
- Client: ****
- Project: ***
- Billing Identifier: ***

Account and server details
- Account: ****
- Subscription name: ***
- Subscription Identifier: ***
- Provider location/region: ***
- Network: ***
- Image: ***
- Username: ***
- Password: ***
- Size: ***

Baseline Request Content    1002

Resource Tags — 1010
- 1008
- Class: ****
- Environment: ***
- Remarks: ***
- 1012
- Specifications: ***
- Update Provider Now: ● Yes  ○ No Dynamic Request Content    1004

[Submit]    [Reset]

Figure 10

1200

| Metadata Tag Type Definition | |
|---|---|
| Metadata Tag 1201 | |
| Resource Type: | Virtual Machine |
| Client: | Client_Name |
| Project: | Testing |
| Tag Name: | Environment |

| Metadata Tag Constraints 1202 | |
|---|---|
| Manage this tag? | Yes  ▼  —1204 |
| Type: | Please Select  ⇕  —1206 |
| Help Text: | <leave blank for none>  —1208 |
| List Values: | <comma separated list>  —1210 |
| Default: | <leave blank for none>  —1212 |

| Metadata Tag Validation 1250 | |
|---|---|
| Mandatory | Yes  —1252 |
| Regular Expression | <comma separated list>  —1254 |
| Maximum | 50  —1256 |
| Minimum | 10  —1258 |

Figure 12

MULTI-CLOUD NETWORK PROXY FOR CONTROL AND NORMALIZATION OF TAGGING DATA

TECHNICAL FIELD

This application relates to centralized control over complex tagging data applicable to technical components, such as virtual machines and other resources, provisioned into a complex global network architecture of virtualized resources.

BACKGROUND

The processing power, memory capacity, network connectivity and bandwidth, available disk space, and other resources available to processing systems have increased exponentially in the last two decades. Computing resources have evolved to the point where a single physical server may host many instances of virtual machines and virtualized functions. These advances had led to the extensive provisioning of a wide spectrum of functionality for many types of entities into specific pockets of concentrated processing resources that may be located virtually anywhere. That is, the functionality is relocated into a cloud of processing resources handling many different clients, hosted by many different service providers, in many different geographic locations. Improvements in multiple cloud system control will facilitate the further development and implementation of functionality into the cloud.

BRIEF DESCRIPTION OF THE DRAWINGS

FIG. 10 shows a technical component request interface.

FIG. 12 shows an example of a metadata type definition.

DETAILED DESCRIPTION

Effectively provisioning and ensuring the proper operation of computing resources in the cloud is a significant technical challenge. In particular, the metadata architecture described below provides a technical solution to establishing a normalized data model for cloud resources, given the existing wide disparity and lack of consistency in how metadata tagging has been approached in the past. New cloud service providers regularly emerge, each offering different target hosting platforms, supporting disparate services, assets, supported technical components, and other features. The multi-cloud network proxy described below controls and facilitates normalization of the metadata tag identifiers and metadata tag content attached to the technical components hosted across multiple target hosting platforms by many different service providers. The network proxy provides a central control mechanism for discovering, monitoring, and updating complex tagging data applied to the technical components provisioned with the cloud service providers, regardless of whether any given service provider natively supports metadata tagging. The network proxy also dynamically generates technical component request interfaces (e.g., to request provisioning of a new resource) that include specifically prioritized metadata tags.

Figure 1:
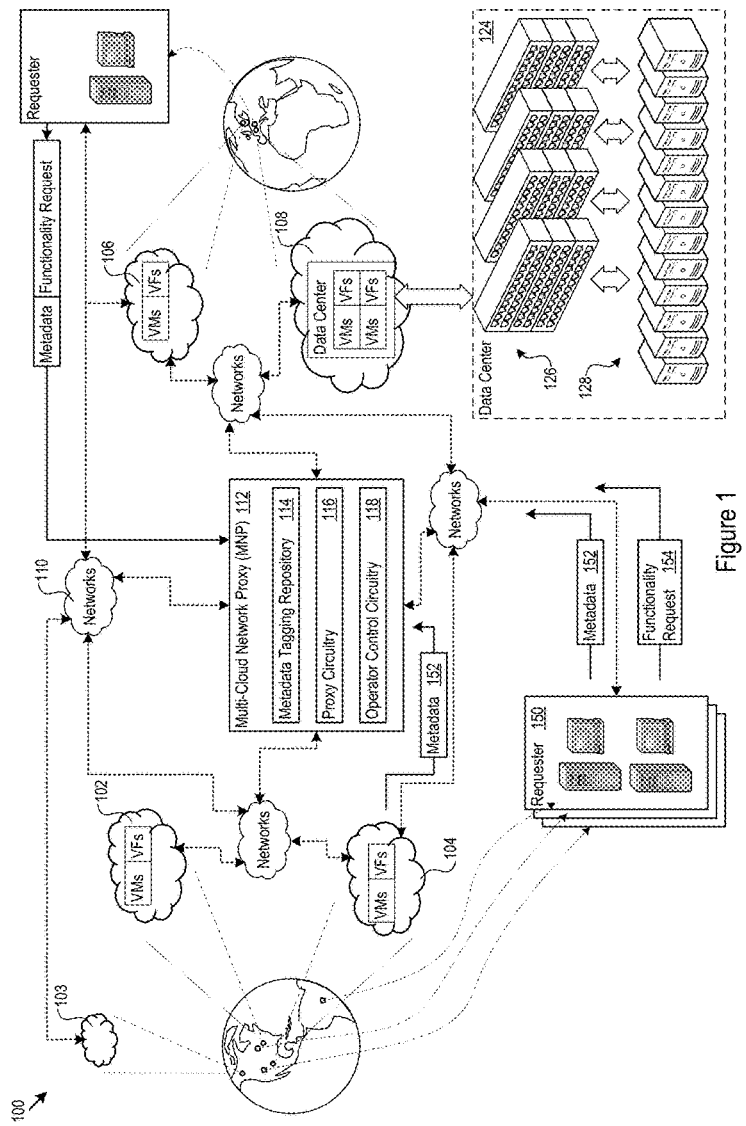
FIG. 1 shows an example of a global network architecture.
Figure 2:
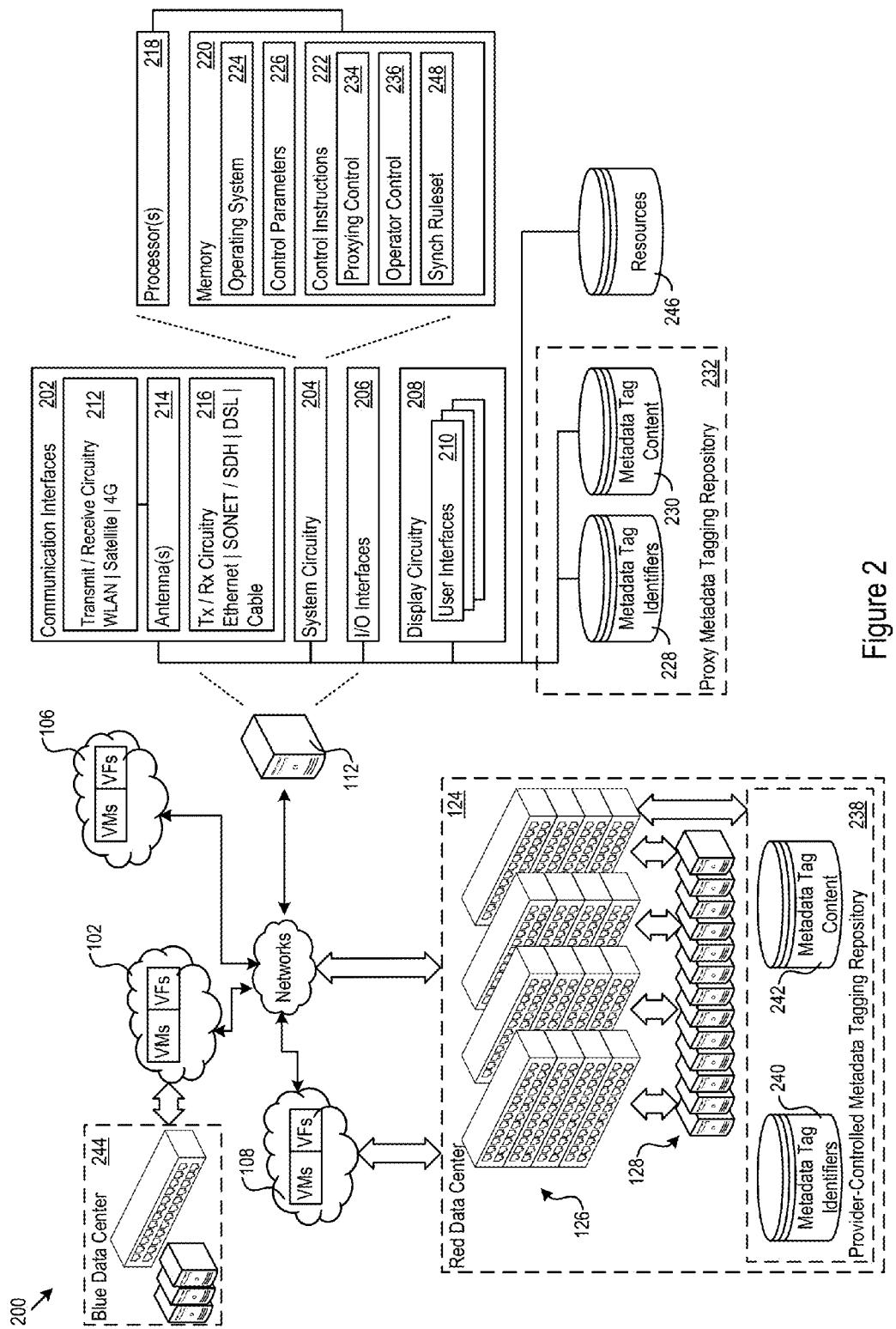
FIG. 2 illustrates an example implementation of a multi-cloud network proxy.

FIGS. 1 and 2 provide an example context for the discussion below of technical solutions for complex metadata tagging and control. The examples in FIGS. 1 and 2 show one of many possible different implementation contexts. In that respect, the technical solutions are not limited in their application to the architectures and systems shown in FIGS. 1 and 2, but are applicable to many other cloud computing implementations, architectures, and connectivity.

FIG. 1 shows a global network architecture 100. Distributed through the global network architecture 100 are cloud computing service providers, e.g., the service providers 102, 103, 104, 106, and 108. The service providers may be located in any geographic region, e.g., United States (US) East, US West, or Central Europe. The geographic regions that characterize the service providers may be defined according to any desired distinctions to be made with respect to location. A service provider may provide cloud computing infrastructure in multiple geographic locations.

The service providers may provide computing resources via hosting platforms that are generally publicly available. Service providers may additionally or alternatively provide computing resources in "on-premises" hosting platforms, which typically refers to a location with increased privacy and security compared to public cloud resources. An on-premise location may be within a secure facility owned by a resource requester which has moved computing functionality to a cloud based implementation, for instance. Examples of service providers include Amazon, Google, Microsoft, and Accenture, who offer different target hosting platforms, e.g., Amazon Web Services (AWS), Google Compute Engine (GCE), Microsoft Azure (Azure), Accenture Cloud Platform (ACP), and Windows Azure Pack (WAP) for on-premise cloud implementations, as just a few examples.

Throughout the global network architecture 100 are networks, e.g., the network 110, that provide connectivity within the service providers and between the service providers and other entities. The networks 110 may include private and public networks defined over any pre-determined and possibly dynamic internet protocol (IP) address ranges. A multi-cloud network proxy (MNP) 112 makes complex cloud architectural provisioning and execution decisions across multiple cloud services, taking into account the global network architecture 100, the various service provider locations and capabilities, and other factors. The metadata tagging and dynamic technical component request interface aspects of the MNP 112 are described in more detail below.

As an overview, the MNP 112 may include a metadata tagging repository 114 configured to, among other functions, store, analyze, and manipulate metadata tags for technical components, e.g., VMs, networks, disk images, and a wide range of other types and assets, provisioned in any of the target hosting platforms. A 'type' may refer to a managed object, and technical components, such as types and assets, provisioned into a region hosted by a resource provider or service provider may be referred to as 'resources'. A 'region' may refer to a unit of hosting capacity in a particular geographic region, where types may be deployed. Another aspect of MNP 112 is the proxy circuitry 116 that is configured to locally maintain metadata tags regardless of whether any particular target hosting platform natively supports metadata tagging. Metadata 152, including metadata tag identifiers and metadata tag content, also flows between the MNP 112, the resource requester 150, and the service providers and their target hosting platforms.

The MNP 112 also includes operator control circuitry 118. The operator control circuitry 118, among other functions, is configured to generate metadata tagging control interfaces for adding, changing, and deleting the metadata tag identifiers and the metadata tag content. The operator control circuitry 118 may also accept designations of prioritized or specifically managed metadata tags from among the many possible metadata tag identifiers. In addition, the operator control circuitry 118 dynamically generates a technical component request interface. The request interface facilitates resource requester submission functionality requests 154 for new technical components to be provisioned into a particular target hosting platform. The technical component request interface adapts to the prioritized metadata tags by including the prioritized tags and providing content entry fields for those tags.

Each service provider has a widely varying set of technical characteristics in the individual target hosting platforms. For instance, FIG. 1 shows a target hosting platform implemented by a data center 124 for the service provider 108. The data center 124 supports running many different virtual machines (VMs), each potentially running many different virtual functions (VFs). The data center 124 may include a high density array of network devices, including routers and switches 126, and host servers 128. The host servers 128 support a particular set of computing functionality offered by the service provider 108 from the data center 124.

As just one of many examples, the service provider 108, through the data center 124 and its other infrastructure, may support many different types of virtual machines, differing by number of processors, amount of RAM, and size of disk, graphics processors, encryption hardware, or other properties; multiple different types of web front ends (e.g., different types and functionality for websites); several different types of database solutions (e.g., SQL database platforms); secure data storage solutions, e.g., payment card industry (PCI) data (or any other secure data standard) compliant storage; several different types of application servers; and many different types of data tiers. Further, the service provider 108 and the data center 124 may have further characteristics, including whether the data center 124 is an on-premise or public location; which networks can provide connectivity to the data center 124; which assets the service provider 108 supports; and other characteristics.

FIG. 2 shows an example implementation of the MNP 112. The MNP 112 includes communication interfaces 202, system circuitry 204, input/output (I/O) interfaces 206, and display circuitry 208 that generates user interfaces 210 locally or for remote display, e.g., in a web browser running at the resource requester 150. The user interfaces 210 and the I/O interfaces 206 may include graphical user interfaces (GUIs), touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include any combination of hardware, software, firmware, or other logic. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality in the MNP 112. As just one example, the system circuitry 204 may include one or more instruction processors 218 and memories 220. The memory 220 stores, for example, control instructions 222 and an operating system 224. The processor 218 executes the control instructions 222 and the operating system 224 to carry out any desired functionality for the MNP 112. The control parameters 226 provide and specify configuration and operating options for the control instructions 222, operating system 224, and other functionality of the MNP 112.

The MNP 112 also includes volume storage devices, e.g., hard disk drives (HDDs) and solid state disk drives (SDDs). The storage devices may define and store databases that the control instructions 222 access, e.g., through a database control system, to perform the functionality implemented in the control instructions 222. In the example shown in FIG. 2, the databases include a metadata tag identifier database 228, a metadata tag content database 230, and a resource database 246. The metadata tag identifier database 228 and metadata tag content database 230 are logically grouped into a proxy metadata tagging repository 232 for maintaining key/value pairs for metadata characterizing resources deployed into the target hosting platforms. As described further below with respect to FIG. 8, the proxy metadata tagging repository 232 may also define and link metadata tag type definitions for tag content control to selected metadata tags. In other implementations, any of the databases may be part of a single database structure, and, more generally, may be implemented logically or physically in many different ways. Each of the databases 228, 230, 246 defines tables storing records that the control instructions 222 read, write, delete, and modify to perform the processing noted below.

The system circuitry 204 may implement the proxy circuitry 116 and the operator control circuitry 118, e.g., as control instructions 222 executed by the processor 218. The control instructions 222 implement a central proxying control 234 for discovering, monitoring, updating, and proxying complex tagging data applied to the technical components provisioned with the cloud service providers. The control instructions 222 also implement an operator control 236 that dynamically generates technical component request interfaces that include specifically prioritized metadata tags.

FIG. 2 also shows several of the service providers. Note that the service provider 108 has established a target hosting platform via the data center 124. The target hosting platform supports local metadata tagging. To that end, the target hosting platform defines a provider-controlled metadata tagging repository 238, including a locally (with respect to the target hosting platform) controlled metadata tag identifier database 240 and a locally controlled metadata tag content database 242. In connection with native metadata tagging, the target hosting platform may implement its own interface console through which the resource requester 150 may establish and modify metadata tags for virtual resources. In contrast, the service provider 102 has established a target hosting environment 244 that does not include native, provider-controlled metadata tagging. Various service providers may or may not implement local metadata tagging, and their metadata tagging capabilities may change over time.

Multi-Cloud Network Proxy with Centralized Resource Tagging Control

The MNP 112 controls and facilitates normalization of the metadata tag identifies and metadata tag content attached to the technical components hosted in the various target hosting platforms by the service providers. The MNP 112 performs this role regardless of whether any particular target hosting platform natively supports metadata tagging. In that regard, the MNP 112 maintains the proxy metadata tagging repository 232 as a centralized source of metadata tagging information. Further, the MNP 112 may store provider capability specifiers (e.g., as data fields in a database, program instructions, program variables, or parameter files) that indicate whether any given target hosting platform natively supports metadata tagging.

Figure 3:
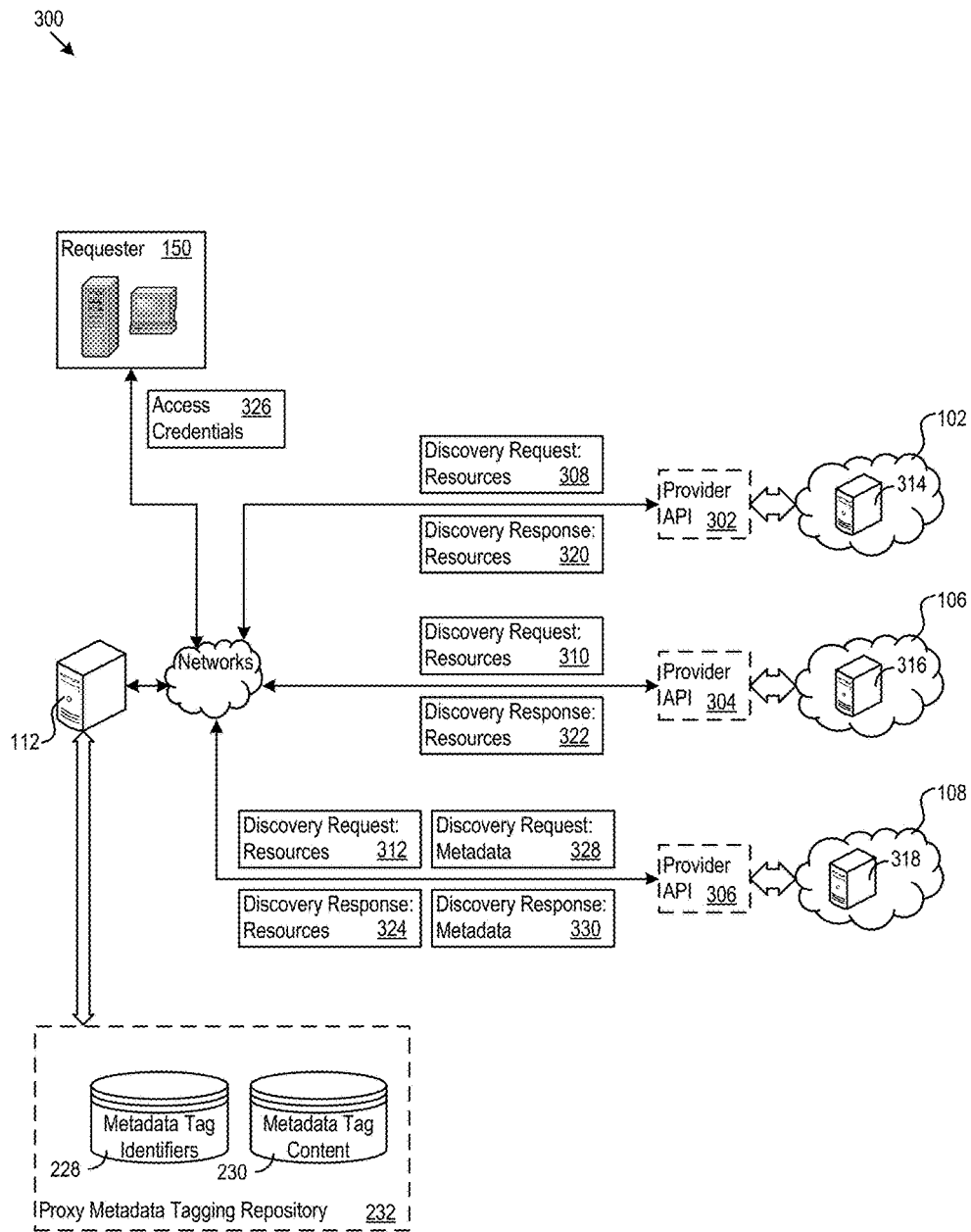
FIG. 3 shows an example of resource and metadata discovery.
Figure 4:
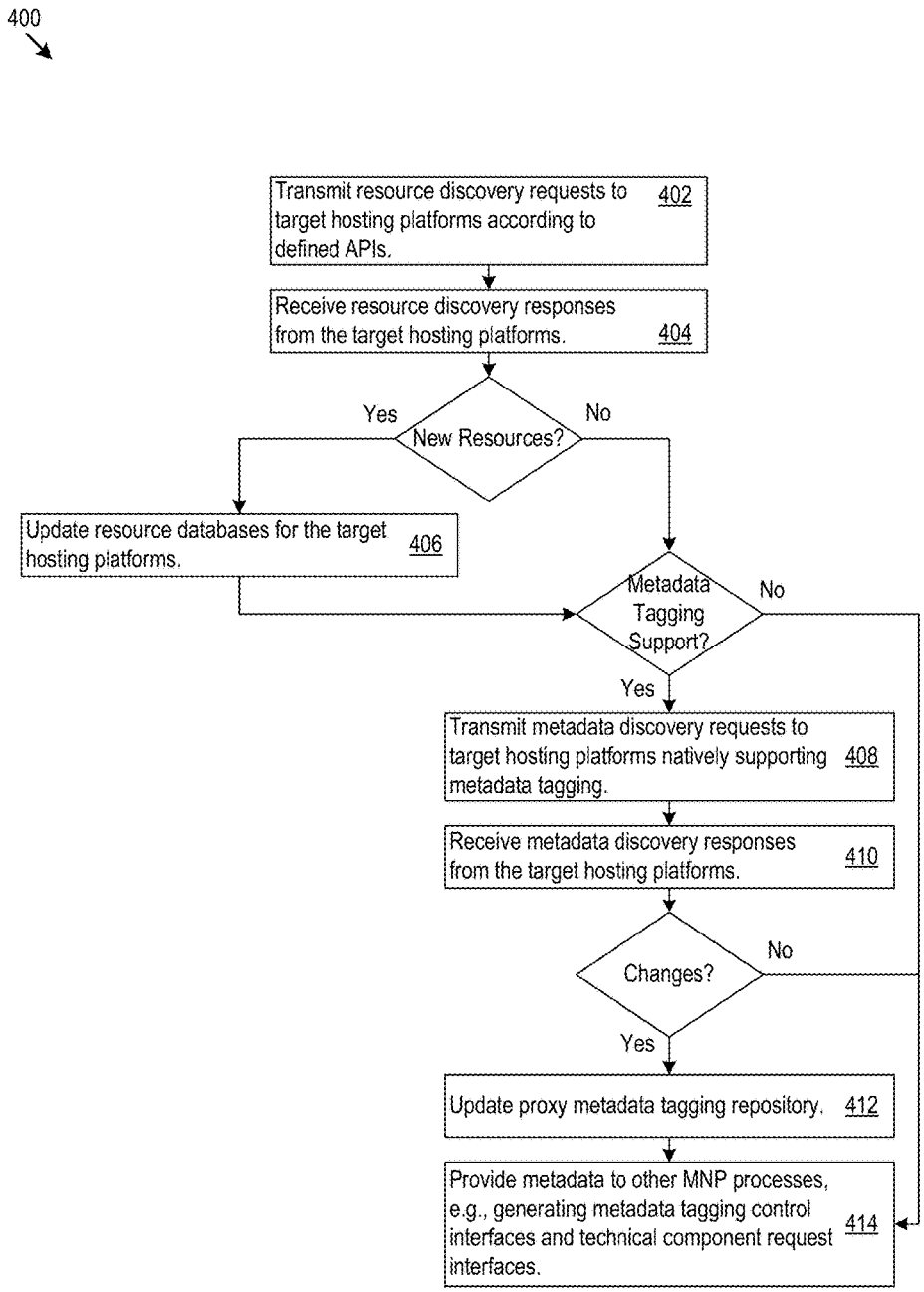
FIG. 4 shows a logical flow for discovery.

FIG. 3 shows an example of resource and metadata discovery 300 by the MNP 112, and FIG. 4 shows a corresponding logical flow 400. In support of its multi-cloud metadata control role, the MNP 112 implements resource discovery, and, to the extent supported by a given target hosting environment, metadata discovery. The MNP 112 may, for instance, connect through service provider application programming interfaces (APIs) 302, 304, and 306 to transmit discovery request messages 308, 310, 312 to the target virtual hosting platforms 314, 316, and 318 of the service providers 102, 106, and 108 respectively (402). The discovery messages specify a request for the target hosting platform to return identifiers of each resource deployed in the target virtual hosting platform for a given resource requester 150, specific resource requester project, user identifier, or at some other specified level of granularity. The MNP 112 receives discovery responses 320, 322, and 324 enumerating the resources as a result of transmitting the discovery request messages 308, 310, 312 (404).

The discovery may include obtaining access credentials 326, e.g. logon username/password from an account owner at the resource requester 150. The MNP 112 submits the access credentials to the corresponding service provider to access and request the resources and attached metadata (if any) for the resources.

The MNP 112 updates its resource database 246 according to the resource discovery responses. For instance, the MNP 112 may add newly discovered resources and remove deleted resources, according to the current state provided in the resource discovery responses.

The MNP 112 also engages in metadata discovery for the resources provisioned in the target hosting platforms. In one implementation, the MNP 112 is configured to call the APIs provided by a service provider to obtain metadata tagging information. Accordingly, when the service provider supports native metadata tagging and has defined such an API, then the MNP 112 may transmit metadata discovery requests 328 to the target hosting platforms (408). The metadata discovery messages request the target hosting platform to return metadata tag identifiers and metadata tag content stored remotely in the provider-controlled metadata tagging repository. The MNP 112 receives the metadata discovery responses 330 (410).

The MNP 112 facilitates centralized proxy control by updating the metadata tag identifiers and metadata tag content locally in the proxy metadata tagging repository 232 (412). The metadata tag identifiers and metadata tag content may drive other processes within the MNP 112 (414), such as the generation of interactive metadata tagging control interfaces and driving dynamic adaptation to technical component request interfaces. For example, the MNP 112 (as described further below) may add specifically identified metadata tag identifiers and tag content fields to technical component request interfaces.

The updates may include adding, modifying, and deleting metadata tag identifiers and adding, modifying, and deleting metadata tag content for the associated metadata tag identifiers. In that regard, the MNP 112 may implement a metadata synchronization ruleset 248 to determine how to process differences between the metadata obtained from the target hosting platform and the metadata currently in the proxy metadata tagging repository 232. For instance, the metadata synchronization ruleset 248 may direct the MNP 112 to overwrite the metadata tag content in the proxy metadata tagging repository 232 with the metadata tag content returned from the target hosting platform, e.g., in all cases, when the proxy metadata tagging repository 232 has no content values yet, or when other conditions are met. As another example, the metadata synchronization ruleset 248 may specify obtaining a decision from the resource requester 150 whether to overwrite, or may specify to never overwrite existing metadata tag content in the proxy metadata tagging repository 232. In other implementations, the metadata synchronization ruleset 248 specifies whether the proxy metadata tagging repository 232 or the provider-controlled metadata tagging repository is the authoritative version of the baseline metadata. That is, synchronization may occur from the proxy metadata tagging repository 232 to the provider-controlled metadata tagging repository, or vice-versa.

The MNP 112 may execute discovery as desired. For instance, the MNP 112 may execute discovery on a regular schedule for all accounts or selected accounts. As another example, the MNP 112 may execute discovery in response to event triggers. One example of an event trigger is registration of a service provider account within the MNP 112. In response to the registration, the MNP 112 may log the account and execute discovery to find, e.g., the servers, networks, and related resources that already exist in the service provider account. Another example of an event trigger is when an operator activates a GUI link for executing discovery.

Expressed another way, the MNP 112 may include a communication interface operable to establish a data connection with a target virtual hosting platform. The MNP 112 establishes a primary metadata tagging repository for technical components hosted by the target virtual hosting platform. The metadata tagging repository stores a metadata tag identifier set and a metadata tag content set linked to the metadata tag identifier set.

The MNP 112 executes proxy circuitry coupled to the communication interface and the metadata tagging repository. The proxy circuitry configured to make a determination of whether the target virtual hosting platform provides metadata tag capture capability, synchronize metadata tag identifiers to the metadata tag identifier set in the primary metadata tagging repository, and synchronize metadata tag content to the metadata tag content set in the primary metadata tagging repository. Furthermore, the proxy circuitry dynamically buffers the metadata tag identifiers and metadata tag content, when the determination is that the metadata tagging repository provides metadata tag capture capability, by transmitting an instruction message over the data connection to direct the virtual hosting platform to synchronize its provider metadata tagging repository to the metadata tag identifiers and the metadata tag content. Synchronization may include adding, deleting, or modifying metadata tag identifiers and metadata tag content according to a metadata synchronization ruleset 248, as noted above.

Figure 5:
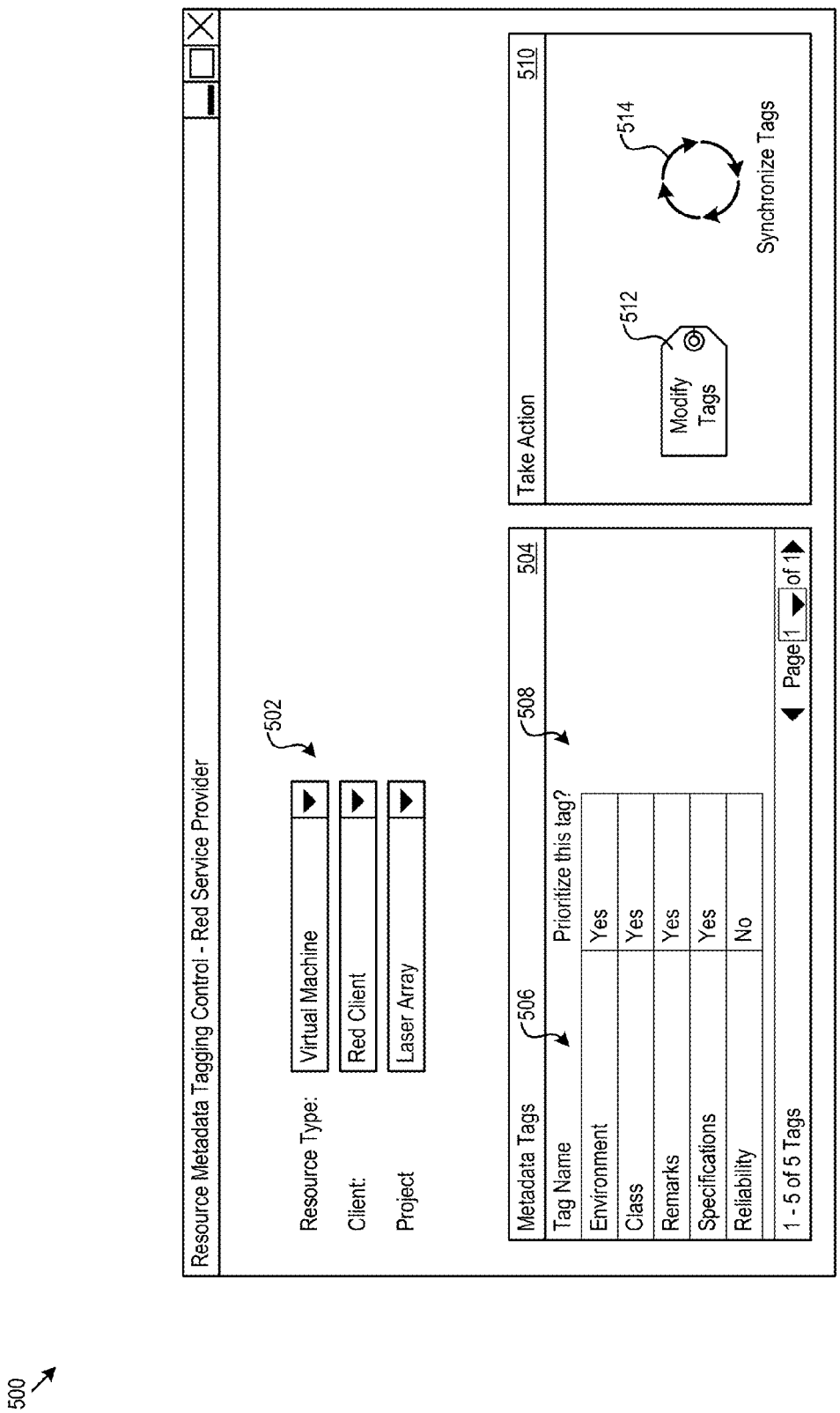
FIG. 5 shows a metadata control interface for controlling metadata tag identifiers.
Figure 6:
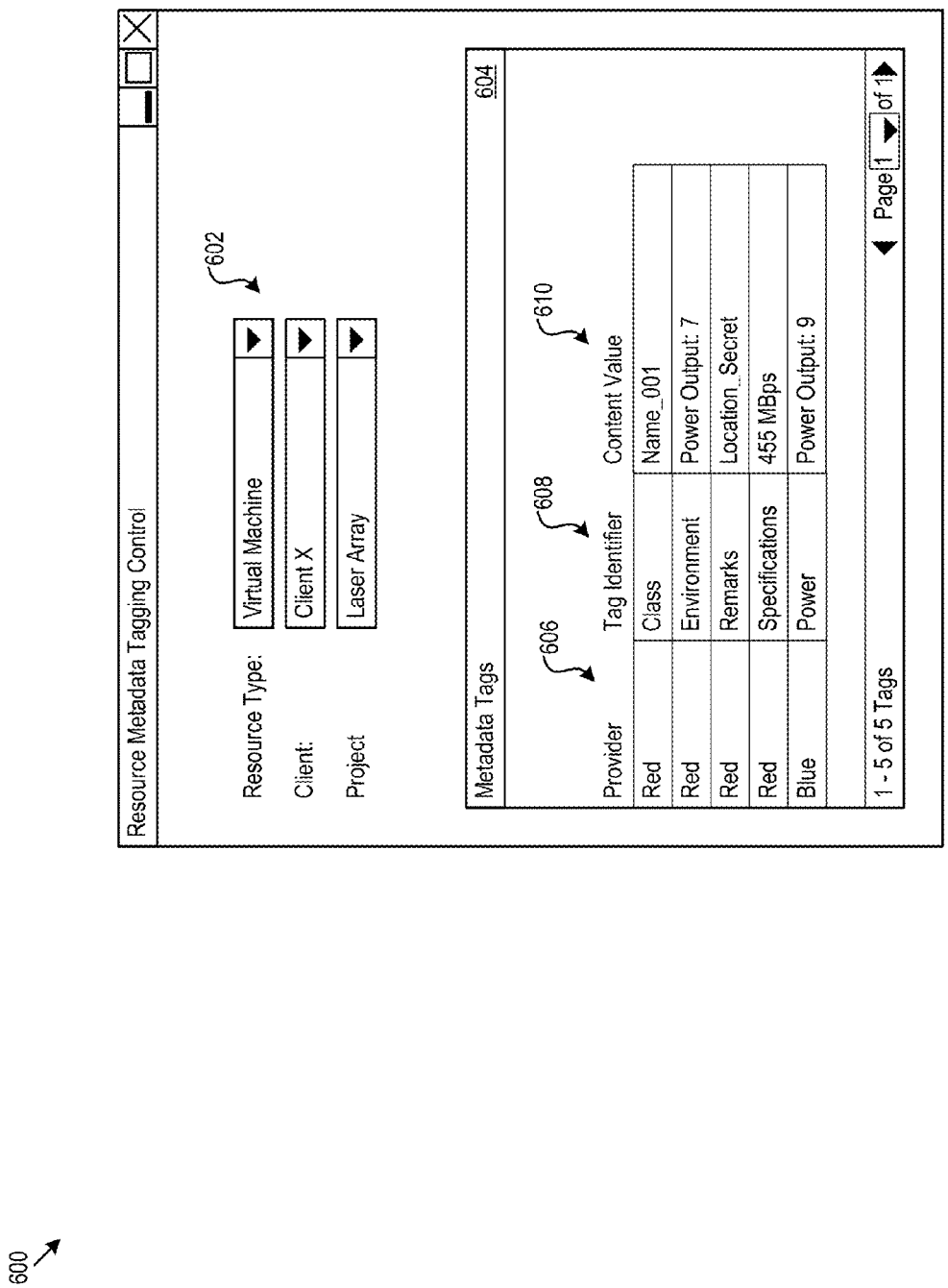
FIG. 6 shows a metadata control interface for controlling metadata tag content.
Figure 7:
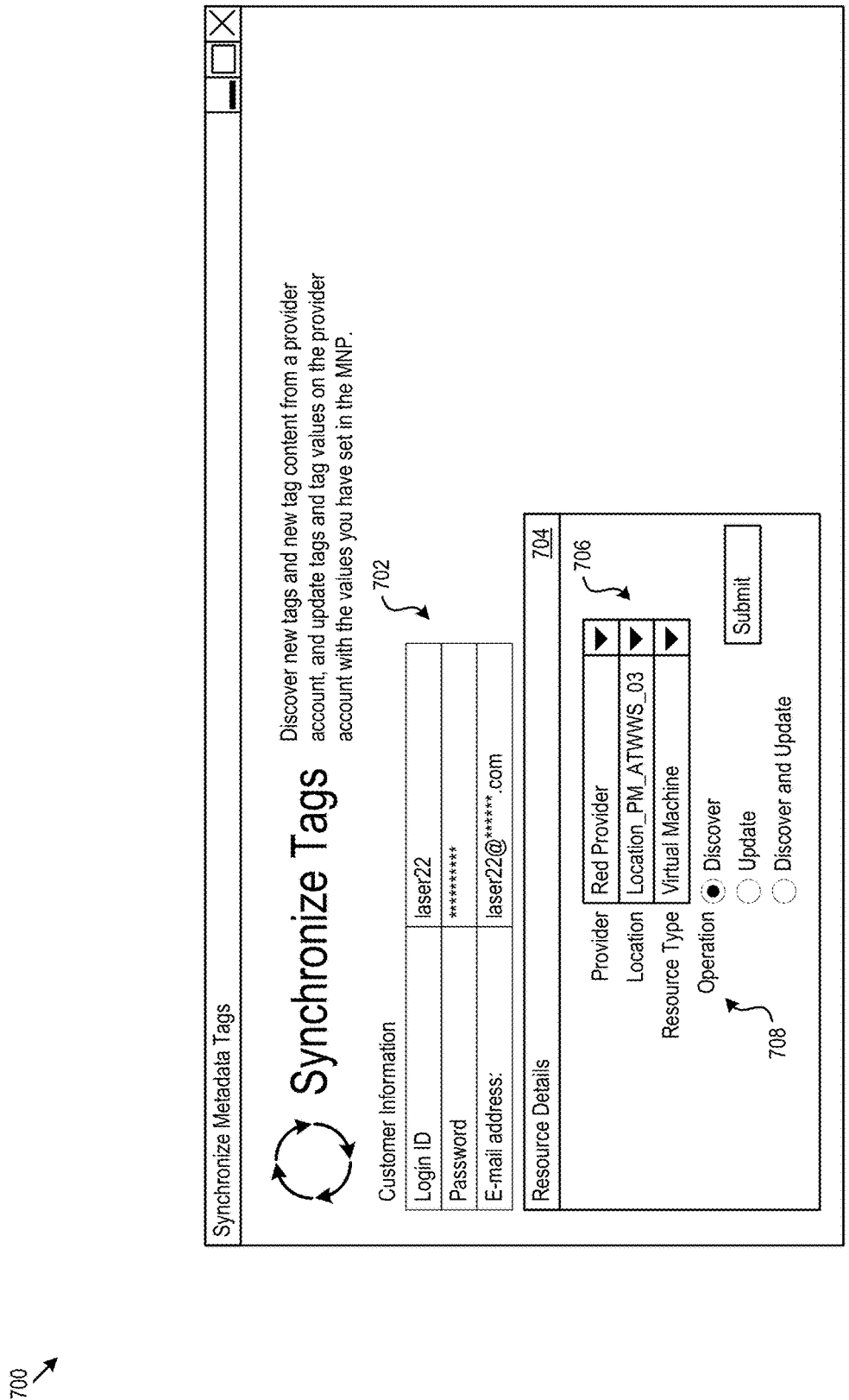
FIG. 7 shows a metadata control interface for metadata tag synchronization.
Figure 8:
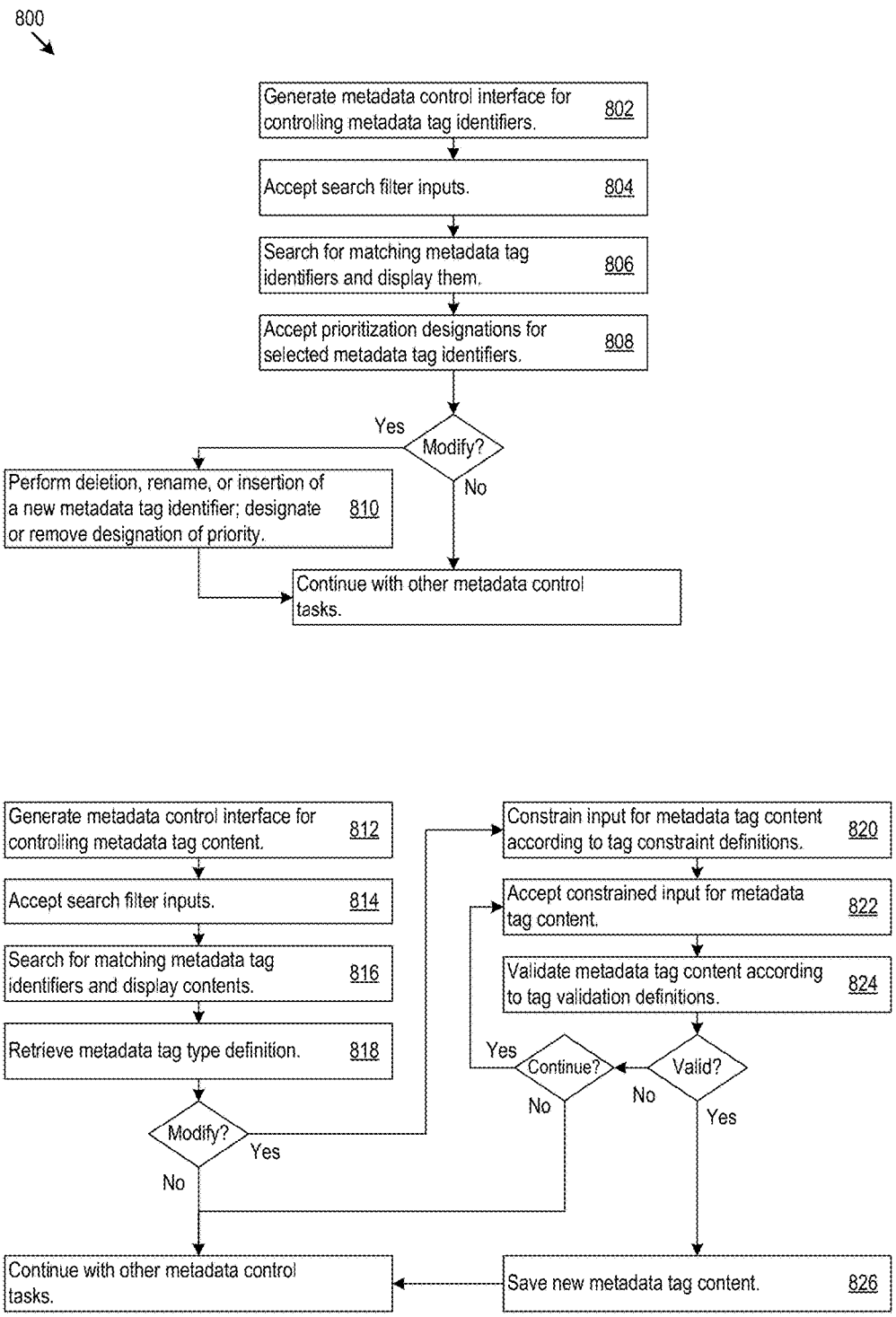
FIG. 8 shows logical flow for controlling metadata tag identifiers and metadata tag content.

FIG. 5-7 show examples of many possible variations of metadata control interfaces. FIG. 8 shows a corresponding logical flow 800 for controlling metadata tag identifiers and metadata tag content.

FIG. 5 shows a metadata tagging control interface ("control interface") 500. In particular, the MNP 112 generates the control interface 500 (802) to facilitate adding, deleting, and renaming new metadata tags, and to facilitate synchronizing metadata tags to target hosting platforms. In this example, the control interface 500 includes tag search filters 502 by resource type, client, and project (804). The matching metadata tags appear in the metadata tag window 504, along with the metadata tag identifiers 506 and prioritization fields 508 (806). The prioritization fields 508 allow the operator to choose whether any given metadata tag is one of particular relevance (808). If so, the MNP 112 may include the prioritized metadata tag in the synchronization of metadata tags noted above. Alternatively or additionally, the MNP 112 may include the prioritized metadata tags and content fields on technical component request interfaces.

The control interface 500 also includes an actions window 510. The MNP 112 populates the actions window 510 with metadata control options. One control option is the Modify Tag control 512. Responsive to activation of the Modify Tag control 512, the MNP 112 performs metadata tag addition, deletion, or renaming according to further operator input. The MNP 112 may then responsively update the proxy metadata tagging repository 232 (810), e.g., by creating a new metadata tag and inserting it into the proxy metadata tagging repository 232.

The MNP 112 may implement tag renaming in different ways. For instance, the MNP 112 may retain a base reference to the tag, e.g., with a specific tag identifier such as globally unique identifier (GUID) known to the service provider and MNP 112, which may be used for synchronization. The MNP 112 may implement a display name for the tag linked to or associated with the GUID reference. To rename the tag, the MNP 112 may change the value of the display name, while retaining the underlying base reference. This mechanism allows the service provider and the MNP 112 to retain the base reference for consistency, while the MNP 112 displays a label (the display name) on top of the base reference for the purposes of operator metadata tagging control through the MNP 112. In other implementation, the MNP 112 may implement a display name which can be renamed by changing its value, but maintains a record of the original name known to the service provider, with MNP 112 synchronizing values with the service provider based on the original name.

FIG. 6 shows a metadata tagging control interface ("control interface") 600. In particular, the MNP 112 generates the control interface 600 (812) to facilitate adding, deleting, and changing metadata tag content. In this example, the control interface 600 also includes tag search filters 602 by resource type, client, and project (814). The MNP 112 retrieves the matching metadata tags and their metadata tag content, if any is currently set, from the proxy metadata tagging repository 232 and populates the metadata tag window 604 (816).

The MNP 112 generates a provider field 606 to indicate the provider to which the metadata tag applies, a metadata tag identifier field 608 to name the metadata tag, and a metadata content field 610 to show the current value, if any, of the metadata tag. The MNP 112 may limit the displayed metadata tags to only those tagged designated as prioritized tags. In some implementations, the MNP 112 defines, stores, and links metadata tag type definitions to metadata tags, e.g., as JavaScript object notation (JSON) definitions stored in database structures in the tagging repository 232. A metadata type definition provides content control and validation for its associated metadata tag. If a type definition is attached to a metadata tag, the MNP 112 retrieves the control definition (818).

Turning ahead to FIG. 12, that Figure shows an example of a metadata type definition 1200. The example type definition 1200 applies to the Environment metadata tag 1201. The type definition 1200 includes, e.g., constraint definitions 1202 and validation definitions 1250. The metadata tag constraints 1202 and metadata tag validation 1250 in the type definition 1200 may be enforced across all customers, or may be customer specific. For instance, the type definitions 1200 attached to metadata tags for a VM resource for one client may differ from the type definitions 1200 attached to metadata tags for a VM resource for a different client.

The constraint definitions 1202 include a manage tag field 1204 that specifies whether the tag is a prioritized tag and a type field 1206 that specifies a datatype that the tag content must agree with. Example datatypes include text, integer, Boolean, currency, percentage, time, date, and list. The constraint definitions 1202 also include a help text field 1208 that specifies, for instance, hover text to display to facilitate operator understanding of the constraints on the metadata tag value (e.g., "Enter a number between 10 and 50."). To facilitate data normalization, for list datatypes, the constraint definitions 1202 also include a comma separated list of valid values 1210 that are presented to the operator for selection, e.g., "Development", "Test", "Production" for the Environment metadata tag 1201. The list entries may be pre-defined, and the MNP 112 may obtain the normalized pre-defined list entries by, e.g., querying an API exposed by a normalization service defined to provide a consistent set of metadata tag value options. In addition, the constraint definitions 1202 may include a default value field 1212 that specifies the initial value for the metadata tag.

The validation definitions 1250 include a mandatory value field 1252 that specifies whether a value must be provided for the metadata tag. The validation definitions 1250 may also include a regular expression field 1254. A regular expression added to the regular expression field constrains metadata tag content to values that match against the regular expression. The maximum value field 1256 and the minimum value field 1258 place upper and lower bounds on, e.g., integer datatypes. Other types of validation fields may be included, such as minimum and maximum length fields.

When a type definition is applicable to a metadata tag, the MNP 112 constrains the input for the metadata tag content according to the type definition (820). For instance, if the type definition requires an integer input, then the MNP 112 rejects characters other than 0-9. As another example, if the type definition requires an input from a pre-determined list of content options, then the MNP 112 accepts tag content only from the list. That is, the control interface 600 accepts inputs to the metadata content fields 610 to add, delete, and change metadata tag values, constrained according to the type definition, if any, for that metadata tag (822).

In addition, the MNP 112 may validate the content input according to a validation rule specified in the type definition (824). As one example, the type definition may specify an upper integer bound and a lower integer bound on the content entry. As another example, the type definition may require a string field to validate against a regular expression, e.g., a regular expression that defines a valid email address. As yet another example, the type definition may indicate that the content field is mandatory and must have a value. When the tag content validates, the MNP 112 saves the new metadata tag content in the proxy metadata tagging repository 232 (826). Tag content synchronization to the service provider may occur when directed by the resource requester 150, e.g., via the Synchronize Tag option 514 described below, at pre-scheduled times, in response to specific trigger conditions, or at other times or for other reasons.

The MNP 112 controls metadata locally through its proxy metadata tagging repository 232. As a result, the MNP 112 may store, maintain, and manipulate metadata tags for target hosting platforms that do not natively support metadata tagging. That is, the MNP 112 acts as a proxy for metadata tagging, and thereby provides a centralized control mechanism across all target hosting platforms for metadata tagging.

Figure 9:
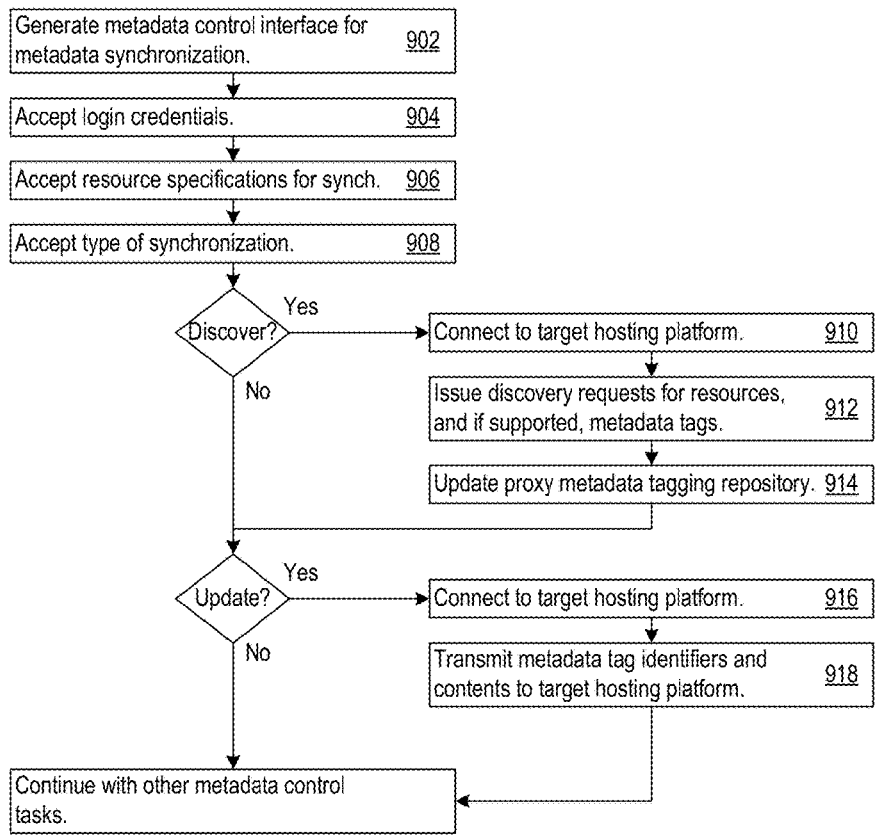
FIG. 9 shows a logical flow for metadata tag synchronization.

Another control option in the control interface 500 is the Synchronize Tag option 514. FIG. 7 shows an example metadata tag synchronization control interface ("control interface") 700 and FIG. 9 shows a corresponding location flow 900. The MNP 112 generates the control interface 700 (902). In this example, the control interface 700 includes a credentials window 702 and a resource details window 704. The credentials window may accept login name and password information, for instance, with which the MNP 112 connects to a particular target hosting platform (904). The resource details window 704 provides input fields 706 for provider, location, and resource type. The input fields 706 allow the operator to specify which types of resources to synchronize at which provider and which provider location (906).

An operation selector 708 allows the operator to specify which type of discovery operation the MNP 112 will perform (908). In response to the Discover option, the MNP 112 establishes a data connection to the target hosting platform (910) and issues discovery requests for resources, and, if supported by the target hosting platform, discovery requests for the metadata tags and metadata tag content attached to the resources. The MNP 112 updates the proxy metadata tagging repository 232 with the discovered metadata tag identifiers and metadata tag contents (914).

In response to the Update option, the MNP 112 establishes a data connection to the target hosting platform (916) and transmits the metadata tags and metadata content currently in the proxy metadata tagging repository 232 to the specified target hosting platform to perform synchronization (918). To push the data, the MNP 112 may call, e.g., APIs provided by the target hosting platform. In some implementations, the MNP 112 may limit the pushed metadata to those metadata tags marked as prioritized metadata tags. In addition, the operation selector 708 provides a combined option to both discover and update metadata tags.

Dynamic Technical Component Request Interfaces

In addition to centralized metadata control, the operator control circuitry 118 in the MNP 112 supports provisioning new resources to a target hosting platform. In that regard, the operator control circuitry 118 may generate resource request interfaces through which the resource requester 150 interacts to specify resource type, placement, account, and other elements that characterize a new resource to be provisioned.

Figure 11:
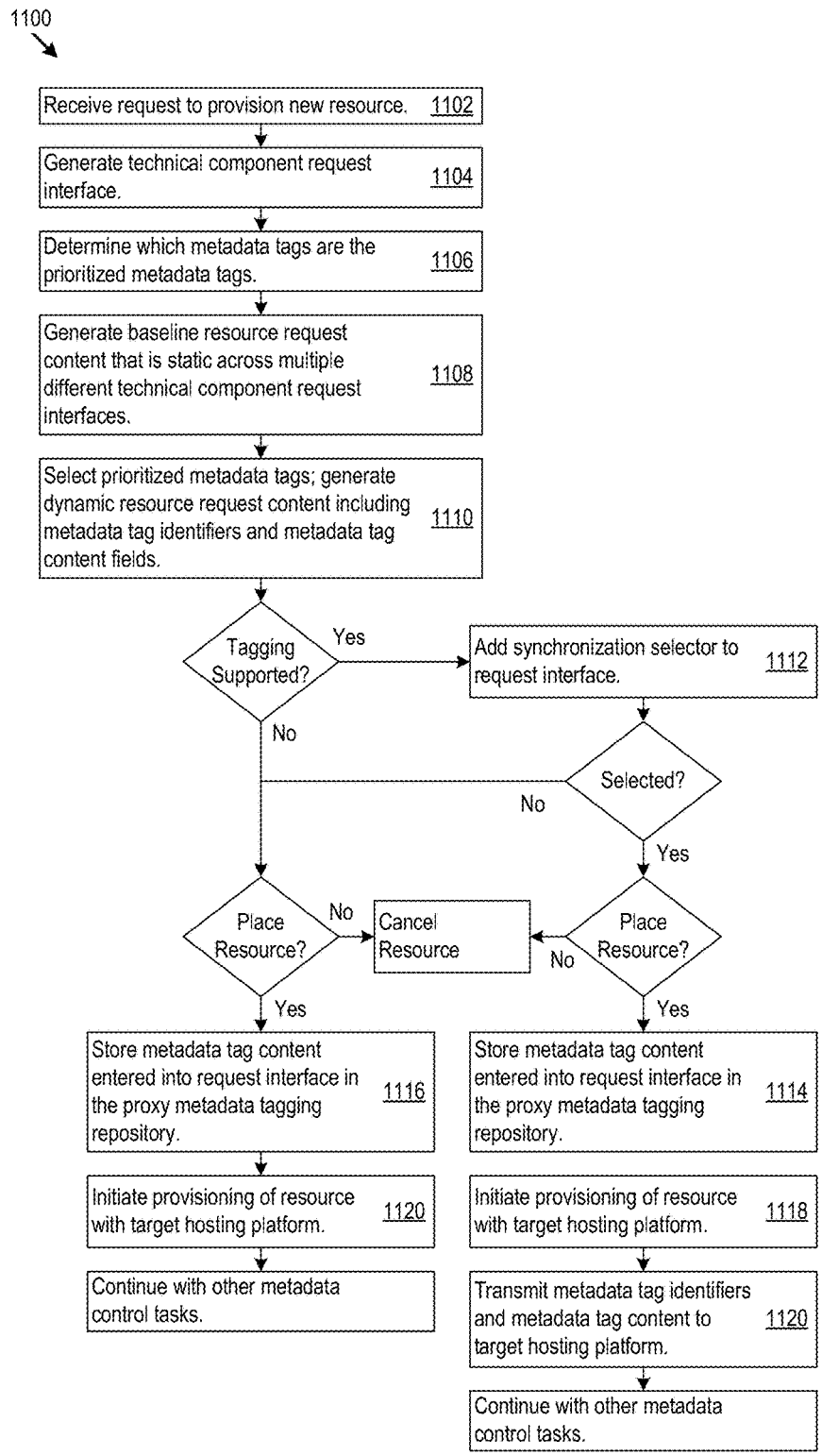
FIG. 11 shows a logical flow for generating a technical component request interface.

FIG. 10 shows an example technical component request interface ("request interface") 1000. The resource requester 150 interacts with the request interface 1000 to submit a request for a new resource to provision to a target hosting environment. FIG. 11 shows a corresponding logical flow 1100 for generating a technical component request interface. As described in more detail below, the MNP 112 supports customization of the request interface 1000 responsive to the metadata control features described above.

In particular, as explained above, the MNP 112 obtains designations of prioritized metadata tags. In response to a resource requester 150 requesting provisioning of a new resource (1102), the MNP 112 may generate the request interface 1000 (1104). For purposes described further below, the MNP 112 also determines which of the metadata tags are designated as the prioritized metadata tags (1106).

The MNP 112 generates the request interface 1000 with baseline resource request content 1002 and dynamic resource request content 1004 for data normalization as further explained below. For the baseline resource request content 1002, the MNP 112 generates content that is static across multiple different technical component request interfaces (1108) and that is relevant to ordering a particular type of virtualized resource. In the example in FIG. 10, the baseline resource request content 1002 includes parameter fields 1006 that are consistent across multiple different requests for resource provisioning. The baseline resource request content 1002 may be present on each request interface for a new VM for a given service provider, for instance. Baseline request content may vary widely from implementation to implementation. Some examples of baseline resource request content may include: customer information, such as login ID and email address; client/project information, including client name, project name, and billing identifier; and account and server details, such as an account name, subscription name, subscription identifier, provider location or region, network, disk image, username, password, and resource size.

For the dynamic resource request content 1004, the MNP 112 adds resource request content to the request interface 1000 that is variable and that is also relevant to ordering a particular virtualized type of resource. In the example in FIG. 10, the dynamic resource request content 1004 includes metadata tag identifiers 1008 and metadata tag content fields 1010. The MNP 112 selects metadata tags for inclusion, as dynamic resource request content 1004, that have been designated as prioritized metadata tags (as also shown in FIG. 5). For instance, when the resource requester 150 is requesting a new VM hosted by the Red service provider, the MNP 112 may add to the request interface the metadata tags previously designed as prioritized for VMs for the Red service provider. The same is true for resources of other types. In other words, the MNP 112 dynamically generates a request interface including metadata tags designated as prioritized for that resource and for that service provider.

As explained above, the metadata tags may be prioritized and metadata tag contents may be constrained and validated by metadata tag type definitions. Further, the MNP 112 may make specific metadata tag recommendations, or make selected metadata tags required, based on specific customers, on the resource being deployed, on the deployment regions, or responsive to other factors. For instance, the MNP 112 may be configured to automatically require certain specific metadata tags to be prioritized and populated for any client requesting a VM. As just one example, the determination of mandatory and suggested tags may be responsive to an analysis of metadata across one or more clients to determine the most useful or relevant metadata tags.

One result of this focused approach to metadata control is that the metadata tags and their content begin to normalize around a discrete set of selected meaningful possibilities. The normalization helps to avoid inconsistent and wildly variable metadata tagging, and therefore helps drive meaningful backend analytics. That is, consistency and control over metadata is a result of the normalization of the metadata data model implemented by the MNP 112, and the normalization drives further technical benefits, including more meaningful analytics of the metadata tags across multiple resource requesters to provide actionable insights into how the resources requesters are defining, deploying, and executing their resources.

The prioritized metadata tags may vary over time, and they often represent the metadata tags that the operator has selected to track most closely. As a result, the MNP 112 generates a request interface 1000 that is more efficient and effective for the resource requester 150. In particular, the request interface 1000 gives the resource requester 150 a head start in defining and characterizing the new resource with respect to the closely tracked metadata. Furthermore, the MNP 112 acts as a centralized metadata control system regardless of whether any given service provider natively supports metadata tagging. That is, the MNP 112 may locally maintain the metadata tags and metadata content for the new resource in the proxy metadata tagging repository 232, regardless of whether the target hosting platform can receive and store the metadata tagging content entered into the request interface 1000.

Note that in that regard, the MNP may also generate a provider synchronization selector 1012 as part of the dynamic resource request content 1004 (1112) If the resource requester 150 proceeds with resource placement, then the MNP 112 stores the metadata tag content that was entered into the request interface 1000 into the proxy metadata tagging repository (1114, 1116). The MNP 112 also initiates provisioning, by the virtual hosting platform, of the resource as specified in the request interface 1000 (1118, 1120). For resources for which the resource requester 150 has selected the synchronization option on the request interface 1000, the MNP 112 initiates the provisioning, also including the dynamic request content. In one implementation, the MNP 112 provides the dynamic request content with provisioning by transmitting (e.g., via API calls), to target hosting platform, the metadata tag identifiers and metadata tag contents entered into the request interface 1000.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and controlled, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A system comprising:
   a communication interface operable to establish a data connection with a target virtual hosting platform;
   a primary metadata tagging repository for virtual machines hosted by the target virtual hosting platform, the metadata tagging repository comprising:
   a metadata tag identifier set; and
   a metadata tag content set linked to the metadata tag identifier set;
   proxy circuitry coupled to the communication interface and the metadata tagging repository, the proxy circuitry configured to:
   make a determination of whether the target virtual hosting platform provides native metadata tagging capability, the native metadata tagging capability comprising implementation of an interface console configured to modify metadata tags;

proxy metadata tag identifiers to the metadata tag identifier set in the primary metadata tagging repository;

proxy metadata tag content to the metadata tag content set in the primary metadata tagging repository; and responsive to the determination, synchronize, in accord with a ruleset, the metadata tag identifiers and metadata tag content, when the determination is that the target virtual hosting platform provides native metadata tagging capability, by transmitting an instruction message over the data connection to direct the target virtual hosting platform to synchronize provider metadata tagging repository of the target virtual hosting platform to the metadata tag identifiers and the metadata tag content, the ruleset specifying obtaining a decision from a requester before overwriting metadata tags during synchronization; and operator control circuitry configured to initiate provisioning, by the target virtual hosting platform, of a virtual machine in accord with the metadata tag content.

2. The system of claim 1, where the proxy circuitry is further configured to:

transmit a discovery message to the target virtual hosting platform, the discovery message comprising a request for the target virtual hosting platform to return metadata tag identifiers stored remotely in the provider metadata tagging repository over the data connection; and proxy the metadata tag identifiers by storing them locally in the primary metadata tagging repository.

3. The system of claim 1, where the proxy circuitry is further configured to:

transmit a discovery message to the target virtual hosting platform, the discovery message comprising a request for the target virtual hosting platform to return metadata tag content stored remotely in the provider metadata tagging repository over the data connection; and proxy the metadata tag content by storing it locally in the primary metadata tagging repository.

4. The system of claim 1, further comprising:

operator control circuitry configured to:

generate a metadata control interface operable to accept new identifiers for the metadata tag identifiers.

5. The system of claim 1, where the operator control circuitry is further configured to:

generate a metadata control interface operable to accept new content for the metadata tag content.

6. The system of claim 1, where the operator control circuitry is further configured to:

generate a metadata tag control interface operable to:

present the metadata tag identifiers; and receive a designation of prioritized metadata tags from among the metadata tag identifiers.

7. The system of claim 6, where the operator control circuitry is further configured to:

determine which of the metadata tag identifiers are designated as the prioritized metadata tags; and dynamically generate a technical component request interface comprising:

baseline resource request content that is static across multiple different technical component request interfaces; and dynamic resource request content comprising:

those metadata tag identifiers that are designated as the prioritized metadata tags; and a metadata content field for each of those metadata tag identifiers that are the prioritized metadata tags.

8. The system of claim 7, where the operator control circuitry is further configured to:

initiate provisioning, by the target virtual hosting platform, of the virtual machine by initiating provisioning as specified in the technical component request interface with the dynamic resource request content to enforce a normalized metadata tag data model for the virtual machine.

9. A method comprising:

establishing a data connection with a target virtual hosting platform through a communication interface;

in a proxy system:

maintaining a primary metadata tagging repository for virtual machines hosted by the target virtual hosting platform, the metadata tagging repository comprising:

a metadata tag identifier set; and a metadata tag content set linked to the metadata tag identifier set;

making a determination of whether the target virtual hosting platform provides metadata tag capture capability;

determining metadata tag identifiers and metadata tag content for the virtual machines;

providing proxy control over the metadata tag identifiers and the metadata tag content by:

inserting the metadata tag identifiers into the metadata tag identifier set in the primary metadata tagging repository;

inserting the metadata tag content into the metadata tag content set in the primary metadata tagging repository; and responsive to the determination being that the metadata tagging repository provides metadata tag capture capability, secondarily buffering, in accord with a ruleset, the metadata tag identifiers and metadata tag content by transmitting an instruction message over the data connection that directs the target virtual hosting platform to synchronize its provider metadata tagging repository to the metadata tag identifiers and the metadata tag content, the ruleset specifying obtaining a decision from a requester before overwriting metadata tags during buffering; and initiating provisioning, by the target virtual hosting platform, of a virtual machine in accord with the metadata tag content.

10. The method of claim 9, further comprising:

transmitting a discovery message to the target virtual hosting platform, the discovery message comprising a request for the target virtual hosting platform to return metadata tag identifiers stored remotely in the provider metadata tagging repository over the data connection; and further providing proxy control by storing the metadata tag identifiers locally in the primary metadata tagging repository.

11. The method of claim 9, further comprising:

transmitting a discovery message to the target virtual hosting platform, the discovery message comprising a request for the target virtual hosting platform to return metadata tag content stored remotely in the provider metadata tagging repository over the data connection; and further providing proxy control by storing the metadata tag identifiers locally in the primary metadata tagging repository.

12. The method of claim 9, further comprising:
with operator control circuitry, generating a metadata tag naming interface operable to accept new identifiers for the metadata tag identifiers.

13. The method of claim 9, further comprising:
with operator control circuitry, generating a metadata tag content interface operable to accept new content for the metadata tag content.

14. The method of claim 9, further comprising:
with operator control circuitry, generating a metadata tag input interface operable to present the metadata tag identifiers and receive a designation of prioritized metadata tags from among the metadata tag identifiers.

15. The method of claim 14, further comprising:
with the operator control circuitry:
determining which of the metadata tag identifiers are designated as the prioritized metadata tags; and
dynamically generating a technical component request interface comprising:
baseline resource request content that is static across multiple different technical component request interfaces; and
dynamic resource request content comprising:
those metadata tag identifiers that are designated as the prioritized metadata tags; and
a metadata content field for each of those metadata tag identifiers that are the prioritized metadata tags.

16. The method of claim 15, further comprising:
with the operator control circuitry:
initiating provisioning, by the target virtual hosting platform, of a virtual machine as specified in the technical component request interface with the dynamic resource request content.

17. A system comprising:
a proxy metadata tagging repository for virtual machines hosted externally with respect to the system, the proxy metadata tagging repository comprising:
a first metadata tag identifier set linked to a first target virtual hosting platform;
a first metadata tag content set linked to the first metadata tag identifier set;
a second metadata tag identifier set linked to a second target virtual hosting platform;
a second metadata tag content set linked to the second metadata tag identifier set;
proxy circuitry coupled to the proxy metadata tagging repository, the proxy circuitry configured to:
access provider capability specifiers stored in the system and determine:
that the first target virtual hosting platform does not support native metadata tagging capability; and
that the second target virtual hosting platform does support native metadata tagging capability in a provider-controller metadata tagging repository under control of the second target virtual hosting platform, the native metadata tagging capability comprising implementation of an interface console configured to modify metadata tags;
maintain metadata synchronism for both the first target virtual hosting platform and the second target virtual hosting platform by:
for the first target virtual hosting platform:
maintaining the first metadata tag identifier set in the proxy metadata tagging repository; and
maintaining the first metadata tag content in the proxy metadata tagging repository; and
for the second target virtual hosting platform:
maintaining the second metadata tag identifier set in the proxy metadata tagging repository;
maintaining the second metadata tag content in the proxy metadata tagging repository; and
additionally buffering, in accord with a ruleset, the second metadata tag identifiers and the second metadata tag content into the provider-controller metadata tagging repository under control of the second target virtual hosting platform, the ruleset specifying obtaining a decision from a requester before overwriting metadata tags during buffering; and
operator control circuitry configured to initiate provisioning, by the second virtual hosting platform, of a virtual machine in accord with the second metadata tag content.

18. The system of claim 17, where the operator control circuitry is further configured to generate a metadata tag input interface comprising:
a metadata tag identifier section; and
metadata tag priority selectors for designating up to a pre-determined number of prioritized metadata tags.

19. The system of claim 18, where the operator control circuitry is further configured to:
determine which metadata tag identifiers within the first metadata tag identifier set are prioritized metadata tags; and
dynamically generate a technical component request interface for a new virtual machine that the first target virtual hosting platform will provision, the technical component request interface comprising:
baseline metadata request content that is static across multiple different technical component request interfaces for multiple different virtual machines hosted by the first target virtual hosting platform; and
dynamic metadata request content comprising:
those metadata tag identifiers within the first metadata tag identifier set that are designated as the prioritized metadata tags; and
a metadata content field for each of those metadata tag identifiers within the first metadata tag identifier set that are the prioritized metadata tags.

20. The system of claim 17, where the proxy circuitry is further configured to:
transmit a discovery message to the first target virtual hosting platform, the discovery message comprising a request for the first target virtual hosting platform to return metadata tag identifiers stored remotely in the provider-controller metadata tagging repository;
further implement metadata synchronism by storing the metadata tag identifiers locally in the proxy metadata tagging repository;
transmit a discovery message to the first target virtual hosting platform, the discovery message comprising a request for the first target virtual hosting platform to return metadata tag content stored remotely in the provider-controller metadata tagging repository; and further implement metadata synchronism by storing the metadata tag identifiers locally in the proxy metadata tagging repository.

* * * * *